(12) United States Patent
Leshe et al.

(10) Patent No.: US 8,210,675 B1
(45) Date of Patent: Jul. 3, 2012

(54) EYEGLASSES TETHER CLIP

(76) Inventors: Keith M. Leshe, Volente, TX (US);
Jerry D. Tredemeyer, Volente, TX (US)

( * ) Notice: Subject to any disclaimer, the term of this patent is extended or adjusted under 35 U.S.C. 154(b) by 0 days.

(21) Appl. No.: 13/051,169

(22) Filed: Mar. 18, 2011

(51) Int. Cl.
*G02C 5/14* (2006.01)

(52) U.S. Cl. .......................................... 351/112; 24/3.3

(58) Field of Classification Search .................. 351/112, 351/111, 158, 41; 24/3.3, 3.12, 3.11
See application file for complete search history.

(56) References Cited

U.S. PATENT DOCUMENTS

| | | |
|---|---|---|
| 5,278,591 A | 1/1994 | Trotter |
| 5,408,728 A * | 4/1995 | Wisniewski .................... 24/3.3 |
| 6,543,895 B2 * | 4/2003 | Fukai ............................ 351/112 |
| 6,637,074 B1 | 10/2003 | Morris |
| 6,802,604 B2 * | 10/2004 | McCormick .................. 351/112 |
| 6,918,669 B1 | 7/2005 | Tamborrino |
| 7,200,897 B2 * | 4/2007 | Silvestro ......................... 24/3.3 |
| 7,255,436 B2 | 8/2007 | Tracy |
| 7,496,991 B2 | 3/2009 | Avery |

* cited by examiner

*Primary Examiner* — Hung Dang

(57) ABSTRACT

An eyeglasses tether clip including a spring clip, a spring, a customizable base having perforation therein for fitting varying sizes and shapes of eyeglasses arms, and a shrink wrap sleeve for securing the base plate onto the eyeglasses, thereby permitting the eyeglasses to be secured to a person's clothing to reduce damage or loss of the eyeglasses. A pen clip may be substituted for the spring clip and spring to enable a user to carry a pair of eyeglasses in a manner similar to that of carrying a typical pen.

9 Claims, 5 Drawing Sheets

US 8,210,675 B1

EYEGLASSES TETHER CLIP

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of eyeglasses tethers are known in the prior art. However, what is needed is an eyeglasses tether clip comprising an adjustable base attachment fittable to the varying lengths and thicknesses of eyeglasses arms, and secured with shrink wrap, to securely fasten a pair of eyeglasses to an article of clothing, or other item, when not in use.

FIELD OF THE INVENTION

The present invention relates to an eyeglasses tether, and more particularly, to an eyeglasses tether clip.

SUMMARY OF THE INVENTION

The general purpose of the present eyeglasses tether with garment fastening clip, described subsequently in greater detail, is to provide an eyeglasses tether which has many novel features that result in an eyeglasses tether which is not anticipated, rendered obvious, suggested, or even implied by prior art, either alone or in combination thereof.

Wearers of eyeglasses well know the inconvenience of carrying eyeglasses when not in use, whereby eyeglasses are lost, misplaced, damaged or broken. Eyeglasses are typically designed for wearing upon the face and not for storing upon the person when not in use. With recognition of the many disadvantages eyeglasses present to carrying on the exterior of the clothing, the present device has been devised to offer a secure mechanism by which any pair of eyeglasses may be fastened to the clothing of the wearer in a convenient, accessible fashion. The present eyeglasses tether clip includes an adjustable base mounting, which can be custom mounted on varying sizes of eyeglasses' arms, and secured by shrink wrap, to create a secure attachment for eyeglasses on the exterior of a person's clothing, to carry and store when not in use. The adjustable base secures the garment fastening clip to any sized eyeglasses arm, rendering the invention useful to any owner of eyeglasses, no matter the varying shape and size of eyeglasses particular to said individual, providing a secure, convenient and accessible mechanism by which to carry eyeglasses when not in use.

Thus has been broadly outlined the more important features of the present eyeglasses tether clip so that the detailed description thereof that follows may be better understood and in order that the present contribution to the art may be better appreciated.

Objects of the present eyeglasses tether clip, along with various novel features that characterize the invention are particularly pointed out in the claims forming a part of this disclosure. For better understanding of the eyeglasses tether and garment fastening clip, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
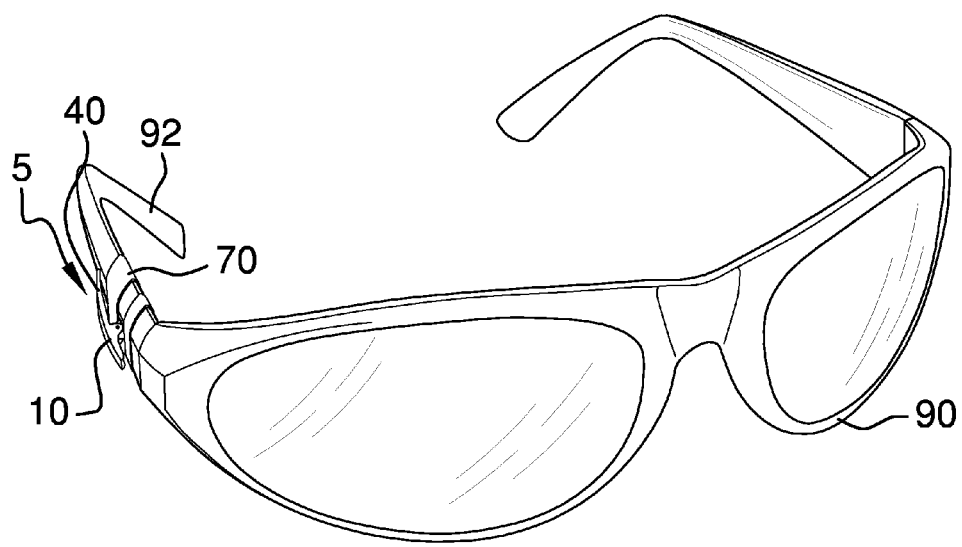
FIG. 1 is an in-use perspective view.
Figure 1A:
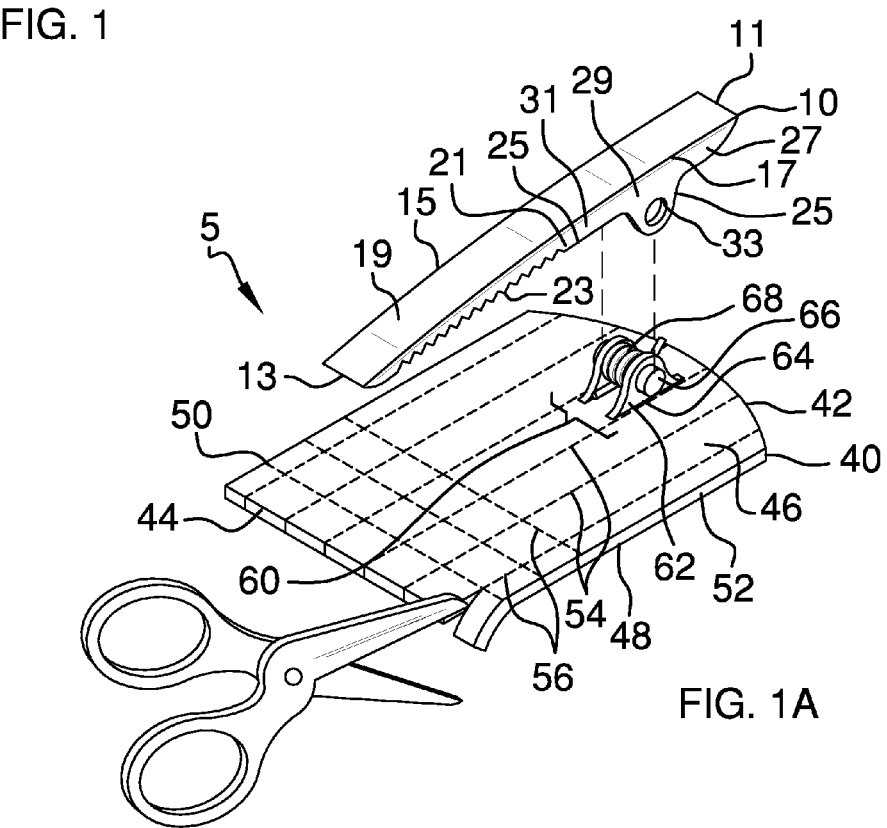
FIG. 1A is elevated view.
Figure 2:
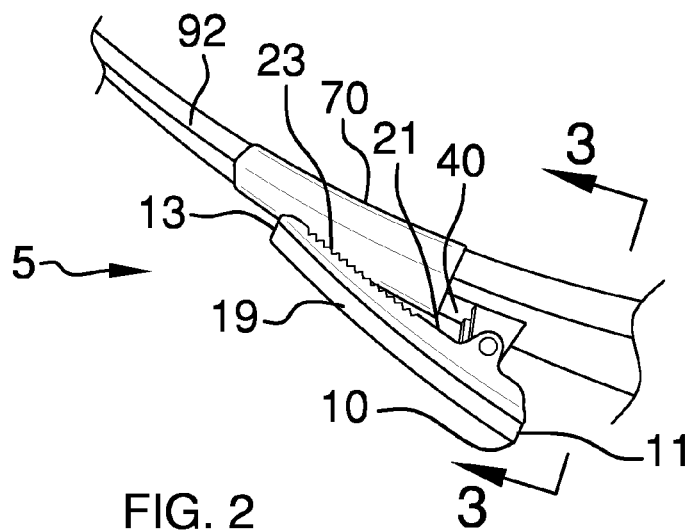
FIG. 2 is perspective view of the assembly fitted to an eyeglasses arm.
Figure 3:
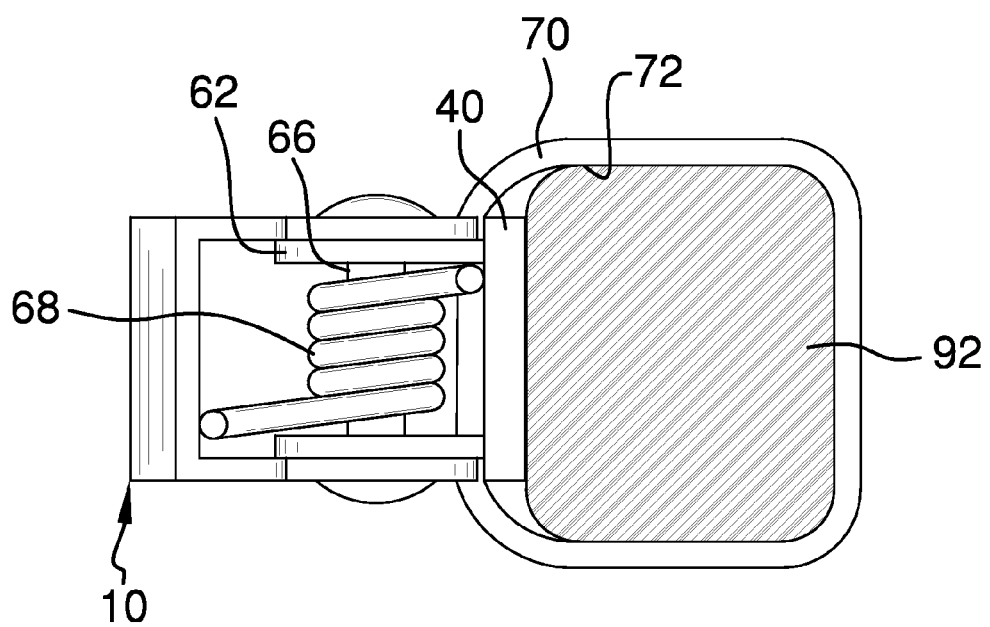
FIG. 3 is a cross sectional view taken along line 3-3 of FIG. 2.
Figure 4A:
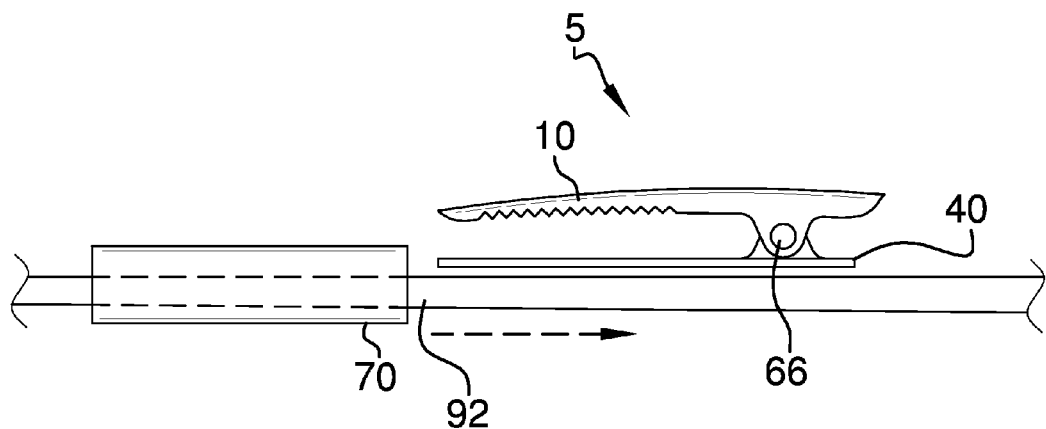
FIG. 4A is a side view exploded.
Figure 4B:
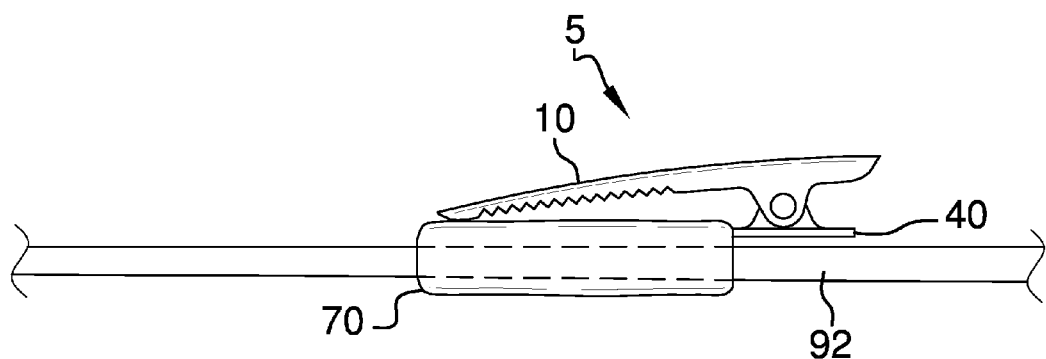
FIG. 4B is a side view with shrink wrap.
Figure 5:
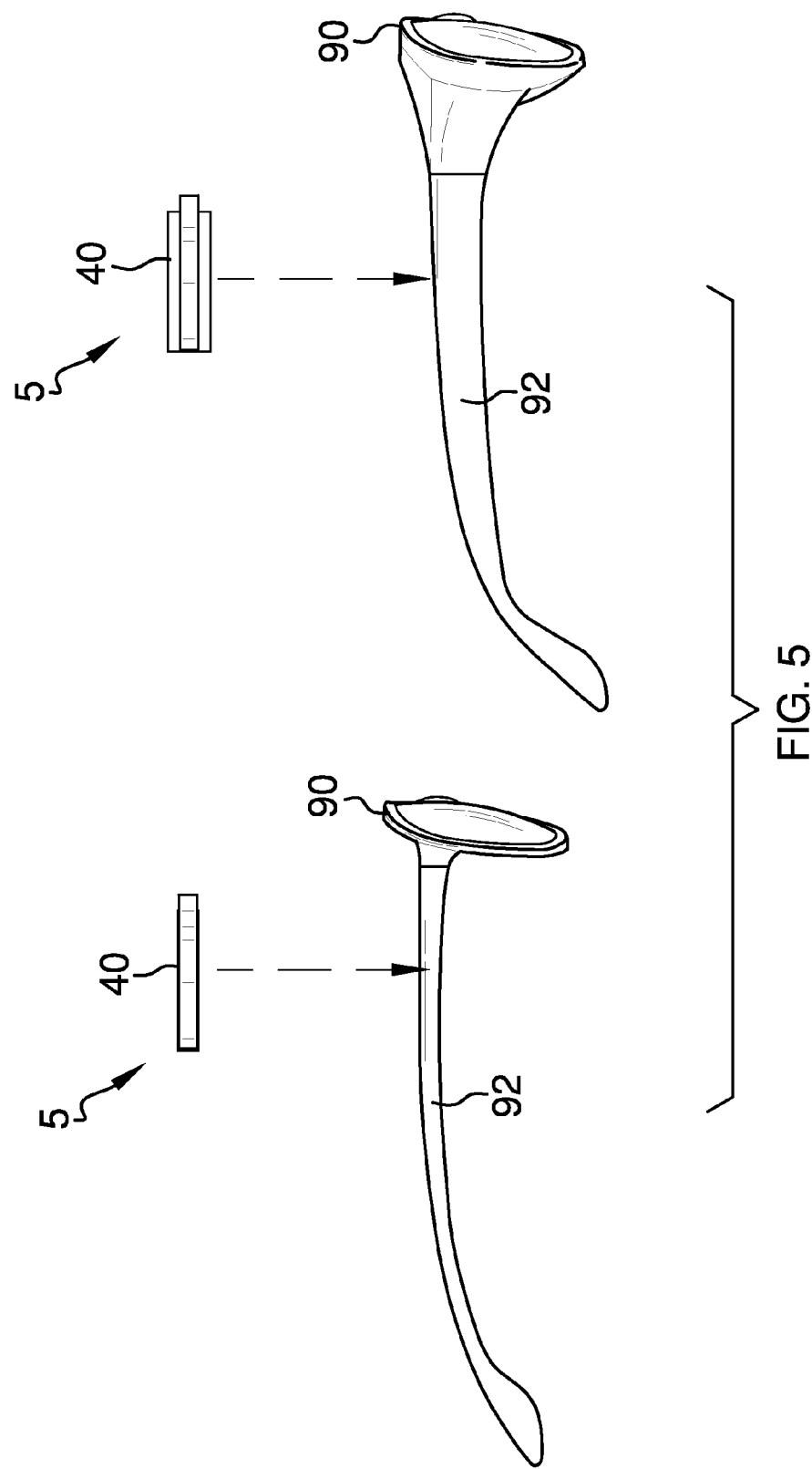
FIG. 5 is a side view without shrink wrap.
Figure 6:
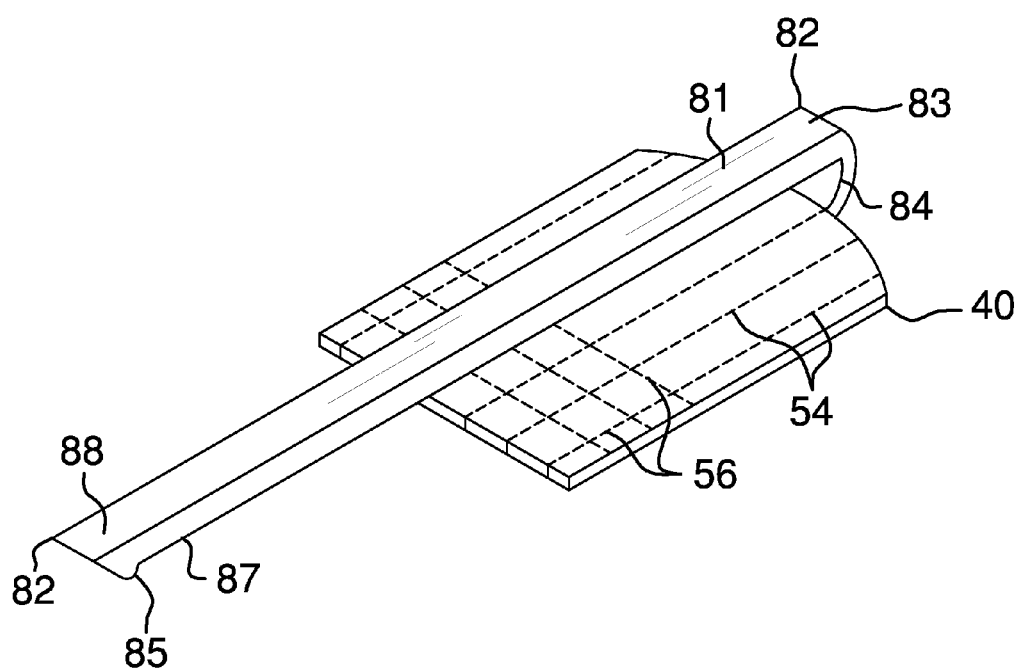
FIG. 6 is an elevated view of another embodiment of the clip.

With reference now to the drawings, and in particular FIGS. 1 through 6 thereof, example of the eyeglasses tether and garment fastening clip generally designated by the reference number 5 will be described.

The present eyeglasses tether clip 5 includes a spring clip 10 mounted on an adjustable base plate 40 by means of a spring 60. The spring clip 10 has a proximal end 11, a distal end 13, a first edge 15, a second edge 17, and an outer face 19 continuously disposed between the proximal end 11, the distal end 13, the first edge 15, and the second edge 17. The spring clip 10 also includes an outer wall 21 continuously extending from the outer face 19 along each of the first edge 15 and the second edge 17. The outer face 19 is slightly arced along the longitudinal axis, from the proximal end 11 to the distal end 13.

Each outer wall 21 has a serrated segment 23 disposed along a lower edge 25 of the outer wall 21 proximal to the distal end 13. The outer wall 21 also has a forward portion 25 disposed between the serrated segment 23 and the proximal end 11 of the spring clip 10. The forward portion 25 has a forward end 27 having a convex horizontal cross-section, a midportion 29 having a parabolic horizontal cross-section, and a rearward end 31 having a substantially rectangular horizontal cross-section. The forward end 27 has a gradually increasing width toward the midportion 29. A hole 33 is disposed through the midportion 29.

The substantially parallelepiped base plate 40 has a convex front end 42, a rear end 44, an upper side 46, a lower side 48, a right wall 50 and a left wall 52. A plurality of continuous first perforations 54 are longitudinally disposed on the base plate 40 from the front end 42 to the rear end 44. In addition, a plurality of continuous second perforations 56 are latitudinally disposed on the base plate 40 from the right wall 50 to the left wall 52 proximal to the rear end 44. The first and second perforations 54, 56 assist in cutting and thereby customizing the adjustable base plate 30 for mounting onto a pair of eyeglasses. The first perforations 54 and second perforations 56 are disposed at ⅛th inch intervals for sizing as appropriate to accommodate various eyeglasses 90 arms 92.

The spring clip 10 operationally engages the spring 60 which is centrally disposed on the base plate 40 proximal to the front end 42. The spring 60 includes a pair of parabolic support members 62 disposed in a parallel position to each other. Each of the support members 62 has a lower end 64 attached to the base plate 40. A cylindrical cross member 66 is disposed through the support members 62 in a position perpendicular to the support members 62. Each cross member 66 has an outer end 67. The outer end 67 of each cross member 66 pivotally engages the hole 33 disposed in the midportion 29 of the spring clip 10 outer wall 21. The spring 60 also includes a spring coil 68 wound around the cross member 66. The spring coil 68 exerts a force against the spring clip 10 to maintain the spring clip 10 in a closed position until the spring clip 10 proximal end 11 is depressed toward the base plate 40.

The device 5 also includes a shrink wrap sleeve 70. The device 5, once appropriately sized for mounting, is secured to the eyeglasses 90 arm 92 by the shrink wrap sleeve 70. The shrink wrap sleeve 70 is a cylindrically arranged polymer film which shrinks upon the application of heat thereto. A heat-producing apparatus (not shown), such as a hair blowdrying accessory, is used to shrink the shrink wrap sleeve 70.

In use, the base plate 40 is pressed against the eyeglasses 90 arm 92 and the shrink wrap sleeve 70 is wrapped around both the arm 92 and the base plate 40 with an interior side 72 of the shrink wrap sleeve 70 faced toward the arm 92 and the base plate 40. Then, heat is applied to the shrink wrap sleeve 70 to tighten the shrink wrap sleeve around the arm 92 and the base plate 40 thereby securing the base plate 40 to the arm 92. Upon the securement of the base plate 40 to the arm, the device 5 may be used to clip the eyeglasses 90 onto a garment or other item.

A pen clip 82 is alternately attached to the base plate 40 front end 11, rather than the spring clip 10. The pen clip 82 includes a c-shaped rightangular internal curve 84 that extends from the base plate 40 front end 42 over the base plate 40 lower side 48 in a position parallel to the base plate 40 right and left walls 50, 52. The pen clip 82 also includes a substantially parallelepiped upper portion 81 having an anterior end 83 that is attached to the internal curve 84. The upper portion 81 extends over the base plate 40 upper side 46 in a position parallel to the right and left walls 50, 21. A curviform lip 85 is disposed on the underside 87 of the upper portion 81 at a posterior end 88 thereof. The pen clip 82 has tensile properties which render the spring clip 10 and spring 60 unnecessary to clip the device 5 eyeglasses to a garment or other item.

What is claimed is:

1. An eyeglasses tether clip comprising:
   a spring clip having a proximal end, a distal end, a first edge, a second edge, and an outer face continuously disposed between the proximal end, the distal end, the first edge, and the second edge;
   an outer wall of the spring clip, the outer wall continuously extending from the outer face along each of the first edge and the second edge, wherein the outer wall is slightly arced along the longitudinal axis from the proximal end to the distal end, the outer wall comprising:
      a serrated segment disposed along a lower edge of the outer wall proximal to the distal end;
      a forward portion disposed between the serrated segment and the spring clip proximal end, the forward portion having a forward end having a convex horizontal cross-section, a midportion having a parabolic horizontal cross-section, and a rearward end having a substantially rectangular horizontal cross-section;
      wherein the forward end has a gradually increasing width toward the midportion;
      a hole disposed through the midportion, operationally engaging the cross member there perpendicularly disposed through the pair of support members;
   a base plate having a front end, a rear end, an upper side, a lower side, a right wall and a left wall;
   a spring centrally disposed on the base plate proximal to the front end, the spring comprising:
      a pair of support members disposed in a position parallel to each other, where in each of the support members has a lower end attached to the base plate,
      a cylindrical cross member disposed through the support members in a position perpendicular to the support members, wherein each cross member has an outer end, wherein the outer end pivotally engages the hole disposed in the midportion of the spring clip outer wall;
      a spring coil operationally engaging the cross member, the spring coil configured to maintain the spring clip in a closed position until the spring clip proximal end is depressed toward the base plate;
   a plurality of continuous first perforations longitudinally releasably disposed on the base plate from the front end to the rear end; and
   a plurality of continuous second perforations latitudinally releasably disposed on the base plate from the right wall to the left wall proximal to the rear end.

2. The eyeglasses tether clip of claim 1 further comprising:
   a shrink wrap sleeve, wherein the shrink wrap sleeve is configured to simultaneously encircle the base plate and an eyeglasses arm upon the application of heat to the shrink wrap sleeve.

3. The eyeglasses tether clip of claim 2 wherein each of the first perforations and the second perforations are disposed on the base plate at ⅛-inch intervals.

4. The eyeglasses tether clip of claim 3 wherein the base plate is substantially parallelepiped and wherein the front end is convex.

5. A eyeglasses tether clip comprising:
   a base plate having a front end, a rear end, an upper side, a lower side, a right wall and a left wall;
   a pen clip comprising:
      a C-shaped rightangular internal curve extending from the base plate front end over the base plate lower side in a position parallel to the base plate right and left walls;
      a substantially parallelepiped upper portion having an anterior end attached to the internal curve, wherein the upper portion extends over the base plate upper side in a position parallel to the right and left walls;
      a curviform lip disposed on the underside of the upper portion at a posterior end thereof;
      a continuous opening between the pen clip and the base plate upper side;
   a plurality of continuous first perforations longitudinally releasably disposed on the base plate from the front end to the rear end; and
   a plurality of continuous second perforations latitudinally releasably disposed on the base plate from the right wall to the left wall proximal to the rear end.

6. The eyeglasses tether clip of claim 5 further comprising:
   a shrink wrap sleeve, wherein the shrink wrap sleeve is configured to simultaneously encircle the base plate and an eyeglasses arm upon the application of heat to the shrink wrap sleeve.

7. The eyeglasses tether clip of claim 6 wherein each of the first perforations and the second perforations are disposed on the base plate at ⅛-inch intervals.

8. The eyeglasses tether clip of claim 7 wherein the pen clip is tensile.

9. The eyeglasses tether clip of claim 8 wherein the base plate is substantially parallelepiped and wherein the front end is convex.

* * * * *